3,122,478
PHARMACEUTICAL EXCIPIENT COMPOSITION
Louis Lafon, Paris, France, assignor to Société Anonyme
dite: Orsymonde, Paris, France
No Drawing. Filed Dec. 12, 1960, Ser. No. 75,126
Claims priority, application France Dec. 14, 1959
4 Claims. (Cl. 167—82)

Excipients are known which consist of surface-active products, particularly those selected from polyoxyethylenes, polyoxypropylenes and mixtures thereof.

The formula of the product known by the name "Pluronic" has been given, which is:

$$HO-(C_2H_4O)_x-(C_3H_6O)_y-(C_2H_4O)_z-H$$

wherein $y$ has a value from 25 to 31 and $x$ and $z$ have values from 130 to 170.

Such products, and especially those of the above-mentioned formula, can be employed directly for the treatment of intestinal conditions.

Attempts have been made to form solutions of these polymeric products and to render such solutions as fluid as possible.

In particular, it has been found that the addition alcohol to solutions of these polymeric products renders them more fluid and thus permits a sufficiently high concentration to be obtained in these solutions for the product to be utilizable in an interesting manner, without the viscosity of the solutions being too high.

However, the presence of alcohol in solutions of products which can be utilized in therapeutics can be noxious, particularly when the product is to be taken by children and babies.

The present invention relates to a process which allows the fluidity of the aforementioned polymers to be enhanced, according to which an organic compound having six carbon atoms, such as non-hydrolyzable hexoses and polyalcohols, is added to solutions of such polymers.

The invention also relates to solutions having improved fluidity and obtained by the aforesaid process.

A number of experiments have been carried out in connection with augmentation of the fluidity of solutions of "Pluronic" corresponding to the formula given above; it has been observed that the addition to the solution of nonhydrolyzable hexoses, such as fructose and galactose, improves the fluidity of the solution, whereas the addition of glucose and saccharose has no effect. It has also been observed in these experiments that the addition of $C_6$ polyalcohols, such as $d$-sorbitol, allows excellent results to be obtained.

A number of characteristic experiments effected on 10 ccs. of solution containing 3 g. "Pluronic" corresponding to the above formula are tabulated below.

Sorbitol in various doses, fructose in various doses and galactose in various doses were used as fluidization additives.

The density of the solution, its pH and the flow time of 10 ccs. in a Mohr burette were measured.

|  | G. | Density | pH | Flow time of 10 ccs., Viscosity |
|---|---|---|---|---|
| Sorbitol | 1 | 1.643 | 3.38 | 3 min. 45 sec. |
| Do | 1.50 | 1.669 | 3.17 | 5 min. 35 sec. |
| Do | 2 | 1.693 | 3.30 | 14 min. 30 sec. |
| Fructose | 1 | 1.669 | 4.22 | 3 min. 20 sec. |
| Do | 1.50 | 1.684 | 3.25 | 9 min. 50 sec. |
| Do | 2 | 1.704 | 3.32 | 11 min. 30 sec. |
| Galactose | 0.50 | 1.646 | 3.25 | 1 min. 50 sec. |
| Do | 1 | 1.667 | 3.32 | 4 min. |

The product, used in admixture with alcohol, required a flow time of the order of 15 min. for a solution of 10 ccs.; the solution containing 0.50 g. galactose has an opalescence at temperatures above 15° C. Also, it is difficult with galactose to exceed a dose of 1 g. for 10 ccs., because of its low solubility. For other hexoses, it is also difficult to exceed doses of 2 g. for 10 ccs.

The test method used permits rapid determination of the viscosity of a solution and it may be remembered that, in the same burette, he flow time for 10 ccs. of distilled water is 12 secs.

The various measurements were all made at a temperature of 20° C.

Other tests have been carried out with solutions containing 0.5 to 3 g. "Pluronic" in 10 ccs. water and the results were analogous.

This fluidization of polymers such as those mentioned above results from a particular phenomenon connected with the constitution of the polymers and the presence of the polyoxyethylene and polyoxypropylene functions. No result is obtained in attempting to fluidize solutions of other polymers; in particular, if levulose, sorbitol or galactose is added to a 15% aqueous solution of the product known under the name "Antarox DJ-970," which is an alkyl-phenoxy-poly-(ethylene-oxy)-ethanol, no improvement in the fluidity is obtained at any temperature whatsoever.

I claim:

1. A composition of matter for use as a pharmaceutical excipient and having improved fluidity, which comprises an aqueous solution of a polymeric product of the formula:

$$HO-(C_2H_4O)_x-(C_3H_6O)_y-(C_2H_4O)_z-H$$

wherein $y$ is an integer from 25 to 31 inclusive and $x$ and $z$ are both integers from 130 to 170 inclusive, said solution also containing an organic compound selected from the group consisting of fructose, galactose, and sorbitol in an amount of 0.50 to 2 g. of organic compound per 10 ccs. of solution which contains about 3 g. of the polymeric product.

2. A composition of matter as set forth in claim 1, wherein the organic compound is fructose.

3. A composition of matter as set forth in claim 1, wherein the organic compound is galactose.

4. A composition of matter as set forth in claim 1, wherein the organic compound is sorbitol.

References Cited in the file of this patent

UNITED STATES PATENTS 2,938,832    Huggins _____ May 31, 1960

OTHER REFERENCES

Pluronic (Wyandotte), received Jan. 2, 1963, page 3.
U.S. Dispensatory, 25th edition, 1955, pages 1302 and 1303, Lippincott Co., Philadelphia, Pa.

UNITED STATES PATENT OFFICE
CERTIFICATE OF CORRECTION

Patent No. 3,122,478                            February 25, 1964

Louis Lafon

It is hereby certified that error appears in the above numbered patent requiring correction and that the said Letters Patent should read as corrected below.

Column 1, in the table, fourth column, line 4 thereof, for "4.22" read -- 3.22 --.

Signed and sealed this 7th day of July 1964.

(SEAL)
Attest:

ERNEST W. SWIDER                          EDWARD J. BRENNER
Attesting Officer                            Commissioner of Patents